Dec. 22, 1925.  1,566,616
F. M. REID
TRAILER DRAWHEAD
Filed Feb. 21, 1925   3 Sheets-Sheet 2
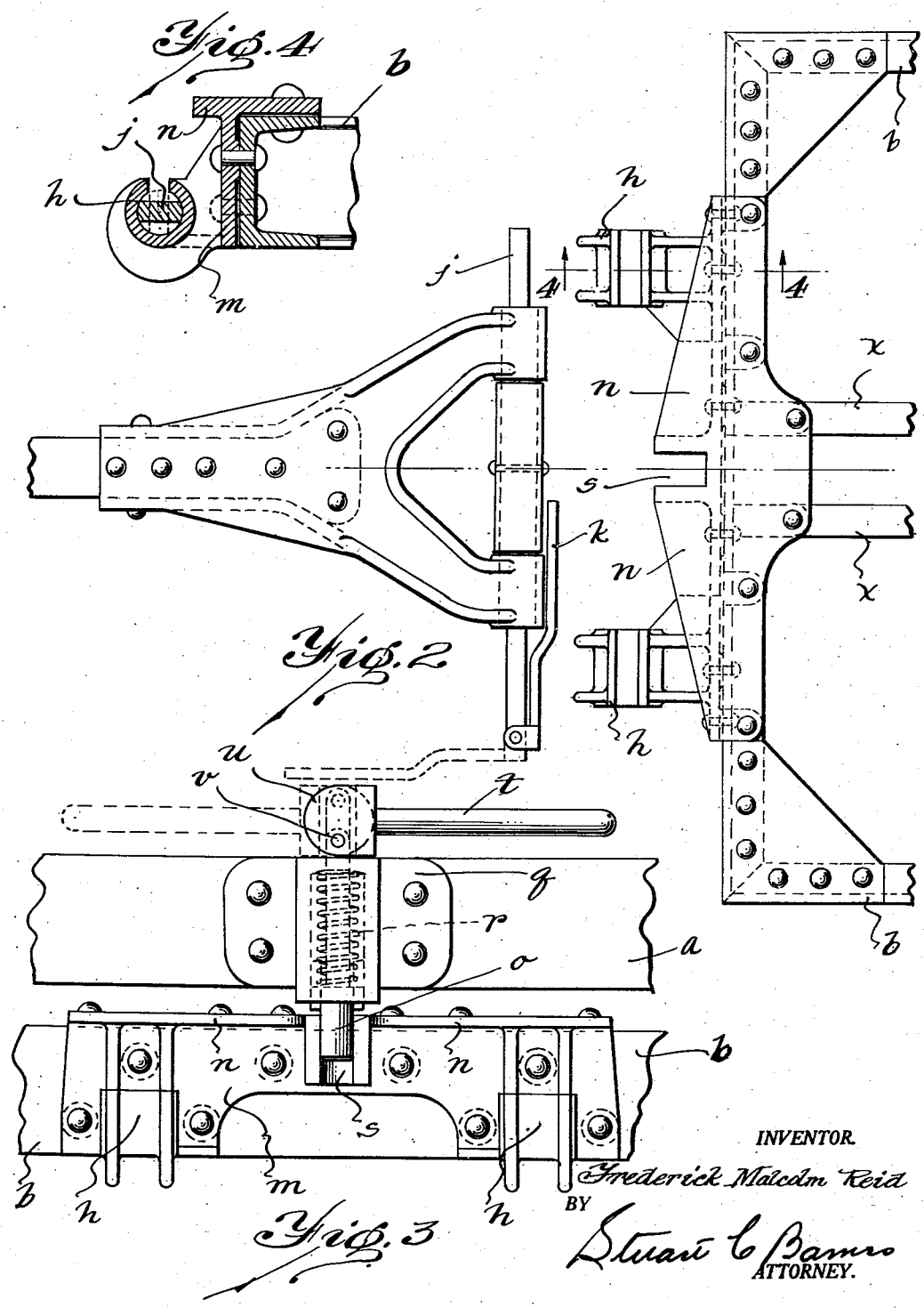

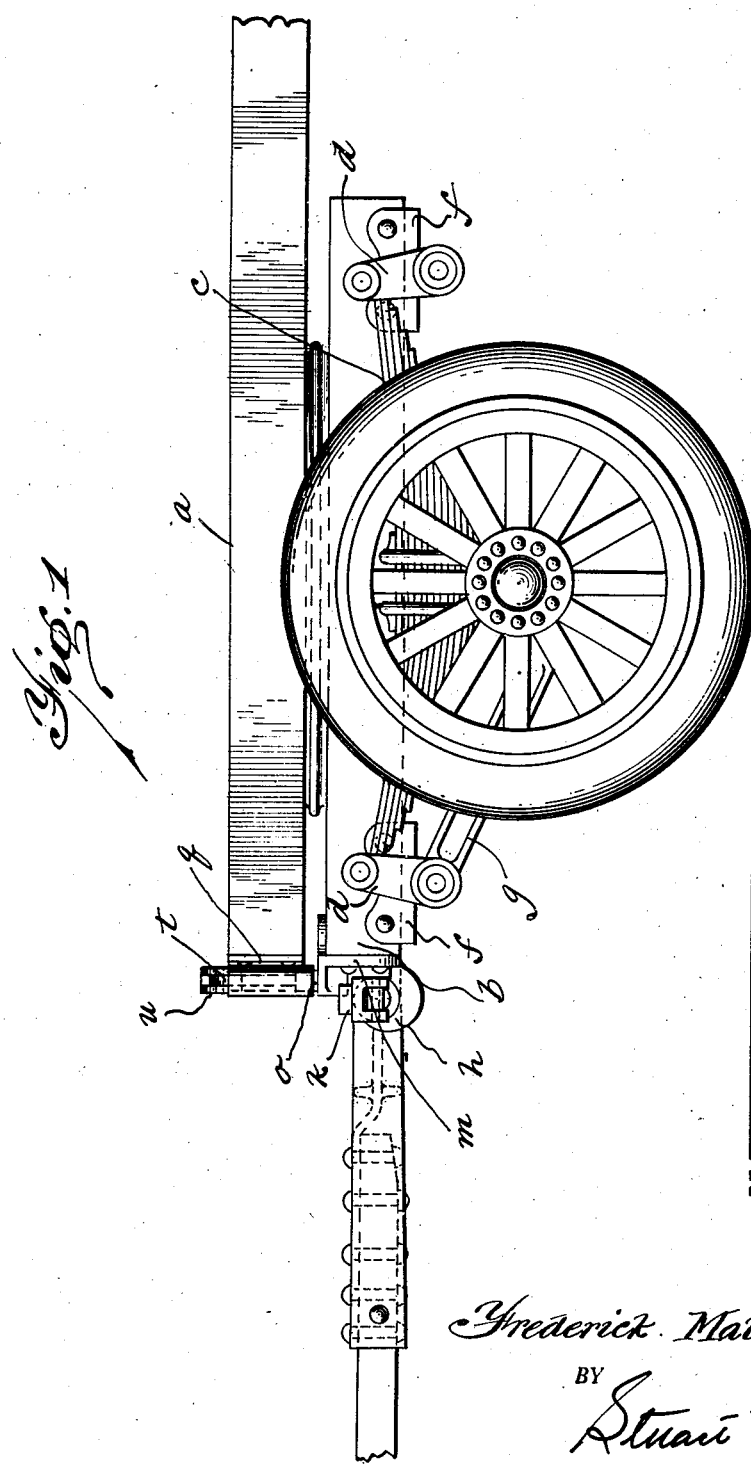

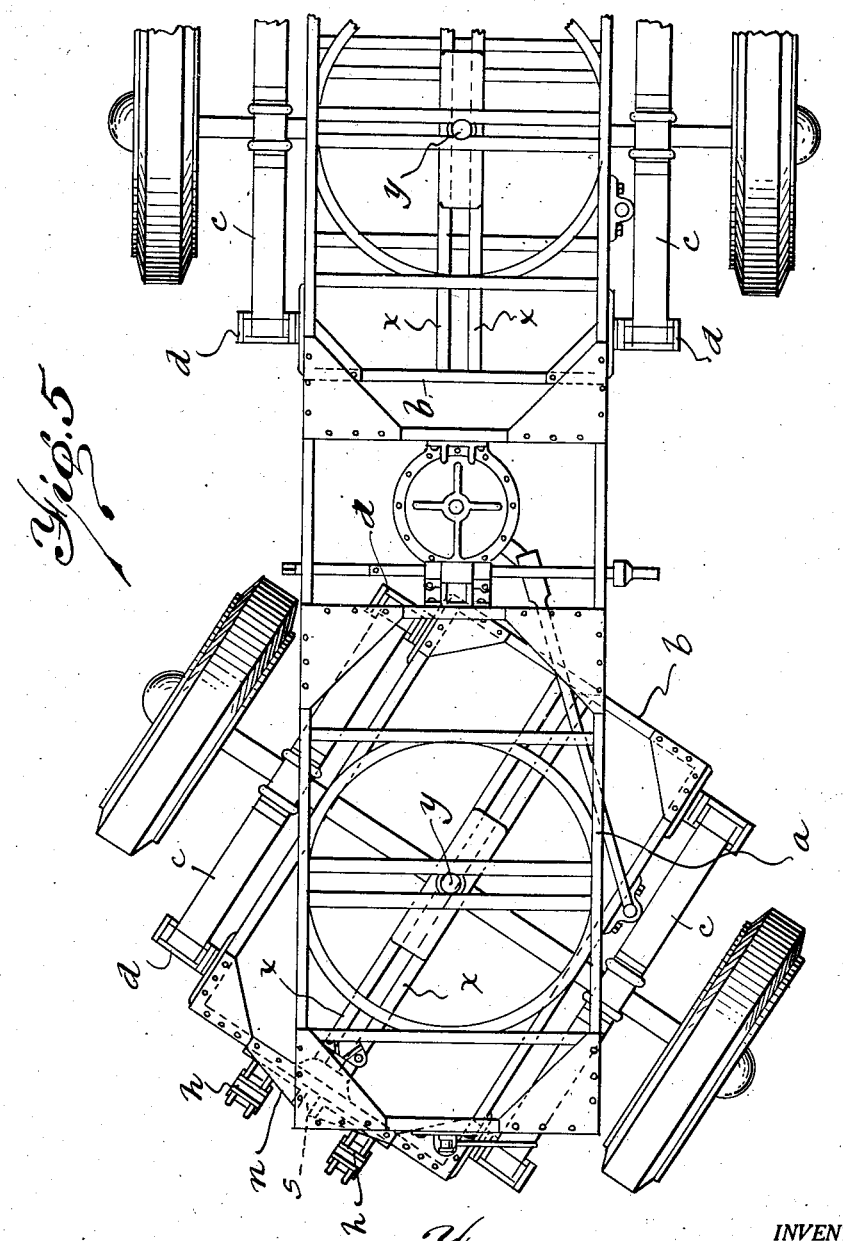

Patented Dec. 22, 1925.

1,566,616

UNITED STATES PATENT OFFICE.

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN.

TRAILER DRAWHEAD.

Application filed February 21, 1925. Serial No. 10,746.

*To all whom it may concern:*

Be it known that I, FREDERICK MALCOLM REID, a citizen of the United States, residing at Detroit, in the county of Wayne and State of Michigan, have invented certain new and useful Improvements in Trailer Drawheads, of which the following is a specification.

This invention relates to draw heads for a trailer or similar vehicle. It is the object of the invention to incorporate in a single fixture devices which serve to afford a detachable connection for the tongue, which serve as a keeper for a center lock, which serve as a table for the center lock to slide upon, and which serve as an anchor for the front ends of the center draft bars of a gear frame or truck frame. This will be more fully explained in the detailed description following:

In the drawings:

Fig. 1 is a fragmentary side elevation of a trailer embodying this improved draw head.

Fig. 2 is a fragmentary plan view showing the draw head and detachable tongue.

Fig. 3 is a front elevation of the draw head and the center lock.

Fig. 4 is a section taken on the line 4—4 of Fig. 2.

Fig. 5 is a plan view of a trailer equipped with my improved draw head.

*a* designates the chassis frame of the trailer, *b* the frame of the truck, or what I term the "gear frame". This frame *b* has gusset plates at the forward corners and is supported on the axle by means of the leaf springs *c* which are supported by shackles *d* on the brackets *f*. A radius rod *g* connects the axle with the front of the gear frame on each side, the connection being a pivotal one, on the stud or rod supported by the spring bracket *f*. It is therefore apparent that the draft of the tractor is communicated to the axle by means of the radius rods and not through the springs; similarly when the gear truck is being used to steer the trailer, the twisting strains are communicated to the axle essentially through the radius rods. This attachment of the radius rods to the spring brackets does not require a long gear truck as is usually the case; hence, the gear truck does not protrude beyond the front of the trailer frame. This permits the use of a single fixture or casting which not only reinforces the front of the gear truck but acts both as a thrust and as a bumper member; it also enables the locking device to be combined with this draw head, as I shall now explain.

The draw head is a single casting provided with a pair of projecting sockets *h—h*; these sockets permit the tongue cross shaft *j* to be entered into the mouth of the socket when the flat portion is turned as shown in the dotted line of Fig. 4. However, when the cross shaft *j* is turned around to the full line position of Fig. 4, it cannot escape. Obviously when the locking lever *k* has been swung back to the position shown in Fig. 2 (full lines) it is impossible to turn the cross shaft so as to remove the tongue. This makes a very simple and effective detachable connection for the tongue within the tongue sockets; these tongue sockets are connected together by a web of very strong section, namely a T section. This web is designated *m*. The top of the T section enlarges at the center for two purposes—it forms a table *n* on which slides the automatic center lock bolt *o*, this bolt is guided vertically in a bracket *q*, riveted to the front of the trailer frame; a coil spring *r* tends to project the nose of this bolt into the keeper socket *s* which is formed of the front of the casting. A lever *t* is provided with a roll-like fulcrum *u* to which is eccentrically pivoted at *v*, the upper end of the sliding bolt. In the position shown in the full lines of Fig. 3 this sliding bolt is in an operative position. If the lever is thrown to this position before the bolt registers with the keeper socket, the same will slide along the table until the gear frame reaches the center position with respect to the trailer frame; then the bolt automatically shoots into the keeper socket. On the other hand, when the lever is thrown to the position shown in the dotted lines of Fig. 3, the bolt is reliably released and held in check so that the gear frame may swivel with respect to the trailer frame, which is the normal position during hauling.

To the rear of the keeper socket, it will be seen that the table portion of the draw head enlarges; this permits the anchoring of the longitudinal center draft bars *x* directly to the draw head. The draw head is a relatively, heavy, strong casting, consequently the draft of the hauling operation is almost entirely eliminated from the rest of the gear frame and is taken through the single cast draw head, thence through the strong longitudinal draft bars which connect at the point y with the trailer frame. It will be obvious that this draw head makes a very useful fixture in connection with such a type of trailer, as it does away with a number of separate fixtures that have to be separately made and riveted to the gear frame.

In place of putting the draft strains on the front cross member of the gear frame, these are almost entirely carried by this heavy draw head and through these connect to the center draft bars. The center lock is not claimed in this application but in co-pending application 10,747.

What I claim is:

1. In a trailer, the combination of a gear frame having gusset plates at the forward corners, a trailer frame to which the gear frame is swiveled, and a draw head for the gear frame, comprising a relatively strong casting secured to the front of the gear frame and extending from one gusset plate to the other and serving to make the front of the gear frame a solid unit.

2. In a trailer, the combination of a gear frame, a trailer frame to which the gear frame is swiveled, and a draw head for the gear frame, comprising a relatively long casting reaching across the front of the gear frame and secured thereto and having an angle section, and a longitudinally extending draft bar anchored at its front end directly to the draw head.

3. In a trailer, the combination of a gear frame, a trailer frame to which the gear frame is swiveled, and a draw head comprising a relatively heavy casting reaching across the front of the gear frame and reinforcing the same, and provided with forwardly projecting integral tongue socket near the ends of said draw head, and one or more central draft bars anchored directly to the draw head.

4. In a trailer, the combination of a gear frame, a trailer frame to which the gear frame is swiveled, and a draw head comprising a relatively heavy casting secured to the front of the gear frame and reinforcing the same, longitudinal draft bars passing through the gear frame and anchored to the center of the draw head for communicating the hauling strain through the draw head to the swivel of the trailer.

5. In a trailer, the combination of a gear frame, a trailer frame to which the gear frame is swiveled, and a draw head comprising a relatively heavy casting of T section, having at the ends of the casting, widely spaced, forwardly projecting tongue sockets, having at the center of the casting a keeper for a lock, the other part of which is secured to the trailer frame.

6. In a trailer, the combination of a gear frame, a trailer frame provided with a center lock and to which the gear frame is swiveled, and a draw head, comprising a relatively heavy angle section casting extending a long distance along the front of the gear frame and having widely spaced, forwardly projecting tongue sockets, and having a flat upper surface to act as a lock table and provided at the center with an opening in the table to form a keeper socket for the center lock.

7. In a trailer, the combination of a gear frame, a trailer frame provided with an automatic lock and to which the gear frame is swiveled, and a draw head comprising a relatively heavy casting running along and across the front of the gear frame to reinforce the same and provided at the ends with widely spaced, forwardly projecting tongue sockets, and having a flat upper surface which acts as a table for the automatic bolt, the said table provided in the center with a keeper socket and at the rear providing an anchoring member, and draft bars for communicating the hauling strains to the swivel of the gear truck, said stringer bars being anchored to said anchoring member of the draw head.

In testimony whereof I have affixed my signature.

FREDERICK MALCOLM REID.